United States Patent [19]

Colucci

[11] 4,416,590
[45] Nov. 22, 1983

[54] HYDRAULIC DRIVE LIQUID TRANSFER PUMP SYSTEM

[75] Inventor: Eugene C. Colucci, Niagara Falls, N.Y.

[73] Assignee: Union Carbide Corporation, Danbury, Conn.

[21] Appl. No.: 223,436

[22] Filed: Jan. 8, 1981

[51] Int. Cl.³ .......................... F04B 9/08; F04B 17/00; F17C 7/02
[52] U.S. Cl. ...................................... 417/231; 417/364
[58] Field of Search ................. 417/231, 223, 364, 13, 417/15

[56] References Cited

U.S. PATENT DOCUMENTS

| | | | |
|---|---|---|---|
| 2,780,950 | 2/1957 | Province | 417/223 |
| 4,097,925 | 6/1978 | Butler, Jr. | 417/231 |
| 4,177,017 | 12/1979 | Schultz | 417/231 |

*Primary Examiner*—Richard E. Gluck
*Assistant Examiner*—Peter M. Cuomo
*Attorney, Agent, or Firm*—Stanley Ktorides

[57] ABSTRACT

A hydraulic drive liquid transfer pump system which utilizes an internal combustion engine to power the pump system wherein a control logic system monitors hydraulic fluid temperature, particulate content, and liquid level, and automatically disengages the liquid pump whenever any one of these parameters exceeds predetermined safety limits.

7 Claims, 10 Drawing Figures

HYDRAULIC DRIVE LIQUID TRANSFER PUMP SYSTEM

BACKGROUND OF THE INVENTION

This invention relates to a hydraulic drive liquid transfer pump system for transferring liquid from a delivery vehicle.

Offloading liquid from a delivery vehicle has been accomplished in a number of ways. One arrangement involves the use of an onboard electric motor to drive a liquid pump. The motor is generally driven by power derived from an electric generator associated with the delivery vehicle. This system has encountered several disadvantages. One disadvantage is that the capacity of electric generator and associated electric motors is such that the units have relatively low power ranges resulting in relatively long offloading times. Larger units with increased power capability are too bulky and heavy to be mounted on the delivery vehicle. In addition, because electrical systems operated in high load service are not generally high reliability systems, there has been experienced considerable downtime and maintenance expense.

Another arrangement employed to offload liquid from a delivery vehicle has been to employ an internal combustion engine to drive the liquid pump. However, because many of the liquids to be offloaded, such as petroleum products or liquid oxygen, pose a safety hazard if near an internal combustion engine, the engine and the liquid pump must be separated by a substantial distance. The internal combustion engine is connected to the liquid pump by mechanical means. This arrangement, involving relatively long mechanical coupling arrangements, has the disadvantage of requiring excessive maintenance and has encountered other operating problems.

In response to these problems, there have been employed system involving tractor-trailer arrangements with an internal combustion engine mounted on the trailer and connected to the liquid pump by a hydraulic system, generally including a hydraulic pump connected to the internal combustion engine and hydraulic lines forming a circuit with the hydraulic pump and a hydraulic motor. The hydraulic motor drives the liquid pump. One such system is described in U.S. Pat. No. 4,177,017 to Schultz.

One disadvantage of the above-described hydraulic system is the relatively low capacity and consequent relatively long liquid pumping times associated with the system. This is primarily due to the limited capacity of the trailer-mounted internal combustion engine. One way to increase the amount of power available to the liquid transfer system is to utilize the reactor motor instead of the trailer-mounted motor. However, the use of the tractor motor, which involves connections from the tractor to the trailer, and the associated higher capacities and/or flow rates resulting from the increased power, give rise to a number of significant safety-related problems. These problems are particularly acute when the liquid to be offloaded is a cryogenic liquid such as liquid oxygen, nitrogen or argon.

One problem is that since the liquid delivery unit is to be separated into tractor and trailer portions, it is imperative that the unit not move or be moved in any fashion during the offloading operation. This was not a problem previously because the trailer portion could be disengaged from the tractor portion and in addition there were no hydraulic connections which could be severed between tractor and trailer.

Another problem which arises with increased capacity is increased hydraulic fluid temperature resulting from greatly increased friction and other energy losses. This heat energy may be removed by a cooler which can be employed to ensure that the hydraulic fluid temperature levels are kept at acceptably low values. However, should there be any malfunction within the cooling circuit, the fluid temperature would increase rapidly to a level which would cause failure of some of the system components. Such a condition would be very unsafe especially if the unit were handling a cryogenic fluid such as liquid oxygen.

Another safety problem associated with running at increased capacity is related to the fluid reservoir level or fluid content within the hydraulic circuit. If the fluid inventory is low, the hydraulic pumping unit would not be able to transmit the increased power capacity associated with the system and can overheat or fail in some other mechanical mode.

Still another safety problem associated with running at increased capacity is related to the particulate content of the hydraulic fluid. It is important for the hydraulic fluid to be clean with low particulate content because, since the hydraulic pumping unit has high capacity and low clearance components, any significant particulate content in the hydraulic fluid would readily score or otherwise harm the mechanical clearances and cause malfunction or mechanical degradation of the system.

It is desirable to decrease the time required to offload liquid from a delivery vehicle. One means of accomplishing this is to utilize the tractor motor of a tractor-trailer delivery vehicle to supply power to the delivery system. This would result in a delivery system of increased capacity. Therefore, a liquid transfer pump system which can utilize the tractor motor and also avoid the above-described safety and reliability related problems which arise when such increased capacity is used would be highly desirable.

Accordingly, it is an object of this invention to provide a hydraulic drive liquid transfer pump system which utilizes the tractor motor of a tractor-trailer delivery vehicle to power the delivery system.

It is another object of this invention to provide a hydraulic drive liquid transfer pump system which operates at increased capacity over those heretofore available.

It is another object of this invention to provide a hydraulic drive liquid transfer pump system which can operate at increased capacity while avoiding the abovedescribed safety and reliability problems.

SUMMARY OF THE INVENTION

The above and other objects which will be apparent to those skiled in the art are achieved by the present invention which comprises in a preferred embodiment an improved hydraulic drive liquid transfer pump system comprising:

(1) a tractor having an internal combustion engine, an air reservoir, air brakes with cylinder and a source of electric power, (2) a power takeoff unit connected to said internal combustion engine having a power takeoff cylinder having an engage port and a disengage port, (3) hydraulic pump means mounted on the tractor and connected to said power takeoff means, (4) a fluid reservoir communicating with said hydraulic pump means, (5) a trailer, (6) hydraulic motor means mounted on said trailer, (7) hydraulic fluid line means intercoupled between said hydraulic pump means and said hydraulic motor means, said hydraulic fluid line means carrying a hydraulic fluid, (8) liquid pump means driven by the hydraulic motor means, (9) filter means located within said hydraulic fluid line means, wherein the improvement consists of a control system connected to said tractor air reservoir and said power takeoff unit comprising:

(a) means to sense the temperature of said hydraulic fluid, said means connected to said source of electric power, (b) means to sense the pressure differential of said hydraulic fluid across said filter means, said means connected to said source of electric power, p1 (c) means to sense the hydraulic fluid level in said fluid reservoir, said means connected to said source of electric power, (d) a manually operated parking control valve in communication by means of pneumatic conduit with the tractor air reservoir, the air brake cylinder, the disengage port of the power takeoff unit, an air operated inversion valve, a manually operated pumping control valve, and an air operated power takeoff valve, (e) said air operated inversion valve ink communication by means of pneumatic conduit also with the tractor air reservoir, the manually operated pumping control valve, the air operated power takeoff valve, and a solenoid operator valve, (f) said manually operated pumping control valve in communication by means of pneumatic conduit also with the air operated power takeoff valve, (g) said air operated power takeoff valve in communication by means of pneumatic conduit also with the engage port and the disengage port of the power take-off unit, (h) said solenoid operated valve in communication by pneumatic conduit means also with said power takeoff valve and by electric connection means to said temperature sensor means, said pressure differential sensor means and said liquid level sensor means.

As used herein the term tractor means a generally diesel powered truck used in hauling tankers.

As used herein the term trailer means a mobile tanker unit used to transfer liquids.

As used herein the term power takeoff unit means an additional mechanism to the tractor transmission enabling the diesel engine to operate the hydraulic pump.

As used herein the term hydraulic pump means a device which converts mechanical force and motion into hydraulic fluid power.

As used herein the term hydraulic motor means a device which converts hydraulic energy into mechanical energy to drive the liquid pump.

As used herein the term manually operated pumping control valve means a valve which provides a change in flow direction in response to manual movement of the operating knob. The valve blocks the change in flow direction when a air signal is applied to the air pilot port.

As used herein the term manually operated parking control valve means a valve with delivery port air bias which provides a change of flow direction in response to movement of the operating knob.

As used herein the term inversion valve means a normally open valve that changes flow direction in response to an air signal applied to the control port.

As used herein the term solenoid operated valve means a valve which provides a change of flow direction in response to electrically energizing the solenoid coil that moves the solenoid plunger connected to the valve spool.

As used herein the term power takeoff valve means a double gas piloted (one domineering) valve which changes flow direction in response to a gas signal applied to a pilot port. When a gas signal is applied at both pilot ports, the domineering pilot overides the other pilot.

DESCRIPTION OF THE INVENTION

Figure 1:
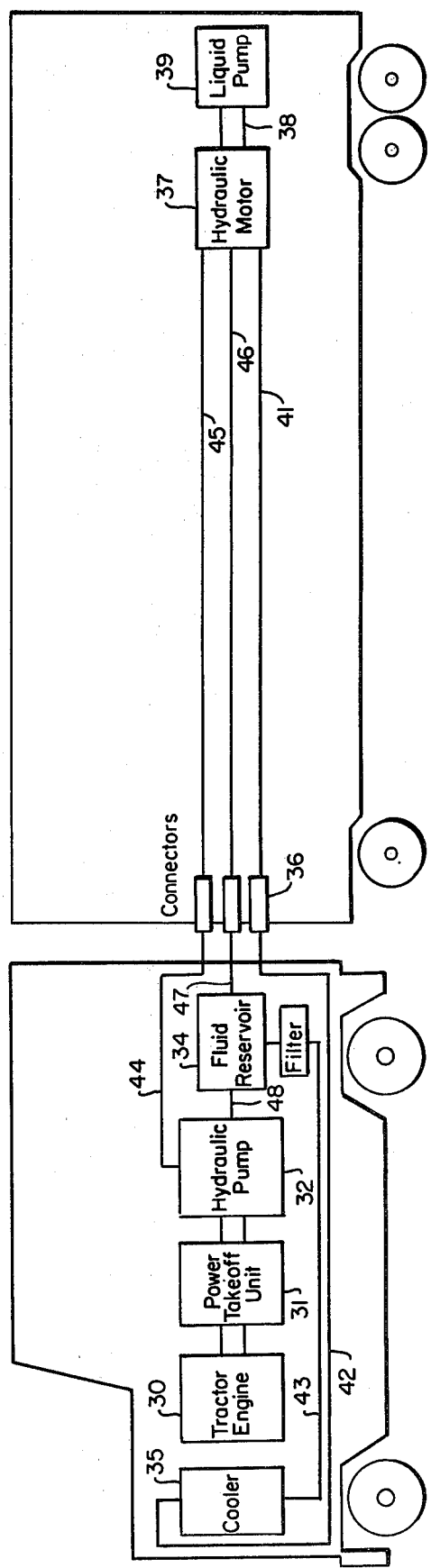
FIG. 1 illustrates the overall arrangement for the improved hydraulic drive liquid transfer pump system of this invention.

This invention concerns a control unit for the hydraulic drive liquid transfer pump system associated with a tractor trailer liquid delivery vehicle. The control unit is utilized with the hydraulic system that utilizes the tractor engine and an associated power take-off to drive a liquid transfer pump. The engine power takeoff drives the hydraulic pump that is connected to a hydraulic motor that is mounted at the rear of the trailer portion of the vehicle and direct shaft connected to a liquid transfer pump. The hydraulic fluid circuit includes a combination of flexible hoses and associated connector unit to make the tractor to trailer connection. The hydraulic lines associated with the trailer unit are rigidly mounted along the length of the trailer and complete the fluid circuit from the hydraulic pump to the hydraulic motor. The hydraulic circuit includes a fluid cooler mounted on the low pressure side of the hydraulic circuit. This cooler ensures that generated heat within the hydraulic circuit is removed and maintains low system temperatures. The hydraulic transfer system is arranged such that the pump and shaft connected hydraulic motor and associated lines are trailer mounted whereas all remaining portions are tractor mounted. This arrangement allows the use of any properly fitted tractor with any properly fitted trailer unit and thereby enhances delivery fleet flexibility.

The control unit associated with the delivery vehicle involves the use of the tractor air supply reservoir and an associated pneumatic logic and valve circuit to monitor several vehicle conditions and automatically disengage power to the liquid transfer pump based on unsafe operating conditions. The arrangement includes the monitoring of the vehicle brake status and hydraulic fluid conditions and the automatic disengagement of the power takeoff based on any adverse condition. One adverse condition would include improperly set brakes which may allow vehicle movement and thereby possible severing of fluid connections. The adverse hydraulic fluid conditions include excessive temperature, low fluid levels, and particulates in the hydraulic fluid. The particulate content in the hydraulic fluid is determined by sensing the pressure drop across the hydraulic system fluid filter. The pertinent fluid conditions are monitored by appropriate sensors that are combined with a solenoid operated pneumatic control valve to cause disengagement of the power takeoff on a fluid system malfunction. The vehicle brake monitor function is incorporated directly into the control unit pneumatic logic circuit.

The control system may also include a second solenoid operated valve in order to assure that the liquid pump system cannot deliver liquid with the electric power source not available, i.e., with the control system inoperative. In this variation the second solenoid operated valve is connected by pneumatic conduit to the manually operated pumping control valve and the power takeoff valve as well as to the source of electric power. Upon the lack of electric power, the second solenoid operated valve shifts and thereby air biases the manually operated pumping control valve so that the pumping control valve is moved to the pump off position which disengages power to the pump so that no liquid can be delivered.

The control system of this invention can also be employed with a hydraulic drive liquid transfer pump system wherein a tractor engine is not employed to power the pump system. Such a system, for example, may be mounted entirely on a trailer, or on a pickup truck, or it may be stationary. Such a control system need not employ the brake parking control feature. Further, such a unit can employ any suitable gas as the pneumatic fluid; it need not necessarily use air. Still further, the power takeoff cylinder need not employ a gas port for the disengage function, but can employ any suitable disengage means, such as a spring.

A preferred hydraulic drive liquid transfer pump system is described with reference to the drawings. However, as can readily be appreciated, the description of a preferred embodiment in no way precludes numerous variations of the hydraulic drive liquid transfer pump system which will become readily apparent to those skilled in the art.

The schematic of the hydraulic circuit associated with the hydraulic liquid transfer pump system is shown on FIG. 1. As can be seen from that figure, the power portion of the circuit is associated with the tractor trailer unit whereas the hydraulic motor and pump portion is associated with the trailer unit. The two sections of the hydraulic circuit are connected by suitable hydraulic lines which include quick connect/disconnect connectors to allow tractor trailer flexibility. The primary power source for the transfer pump is obtained from the tractor engine 30 through an associated power takeoff unit 31. That power takeoff unit is associated with the vehicle transmission and can be engaged manually and disengaged manually or automatically as will be discussed later. The power takeoff unit is connected to the hydraulic pump unit 32 which circulates the hydraulic fluid associated with the system. The hydraulic pump 32 can include a booster pump that is bled back to fluid reservoir 34. The hydraulic pump circulates the hydraulic fluid through associated conduits to the hydraulic motor 37 which is direct shaft connected 38 to the pump 39 that is used to transfer the fluid itself. The hydraulic circuit associated with the system includes a fluid cooler 35 which is mounted in the frontal region of the tractor engine and on the low pressure side of the circuit. Additionally, the hydraulic circuit includes a low pressure drain line 46 from the hydraulic motor to a reservoir 34 which is then connected by line 48 to the hydraulic pump. This drain reservoir system collects any hydraulic fluid by-pass associated with operation of the hydraulic motor and pump, and serves as a closed circuit operation with the fluids system is a closed circuit operation with the fluids circulating from the high pressure side 44 of the hydraulic pump through conduit 45 to the hydraulic motor and then from the hydraulic motor by lines 41 and 42 to the fluid cooler and back to the hydraulic pump by line 43. This schematic illustrates a preferred version of the pump system. Smaller capacity systems may not require a cooler. Also some hydraulic motor units need not employ a separate drain conduit.

The hydraulic fluid conduits that connect the hydraulic pump and hydraulic motor mounted on the trailer portion of the vehicle are a combination of flexible conduits associated with the tractor portion of the vehicle and rigid conduit associated with both the tank trailer portion of the vehicle and the tractor portion of the vehicle. The flexible portions allow the necessary articulation between the tractor and trailer during traffic maneuvers whereas the rigid conduits simply route the fluid between the operative components of the system. The fluid connectors 36 associated with the system are tank trailer mounted and preferably utilize a combination of diameter and fitting variations to ensure proper connections. In order to ensure safe and reliable operation of the system, it is necessary to make the conduit connections between the tractor and trailer units in a positive and proper fashion. From that standpoint, it is desirable that connections are made without significant loss of hydraulic fluid or introduction of any particulate contaminant matter into the conduit. Further, it is required that the three conduits be mated properly to prevent pressure overload of any system component. The connectors preferably employ a combination of particular male and female fittings and diameters in order to help assure proper connections.

Figure 2:
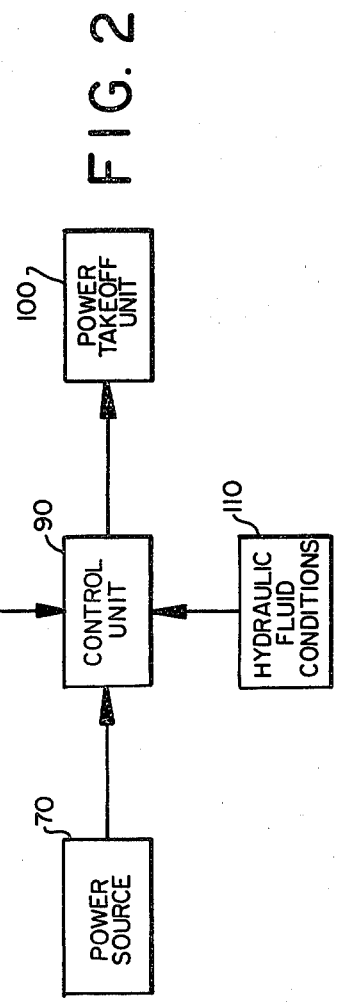
FIG. 2 illustrates the conceptual arrangement of the control system of this invention.

The invention concerns the use of a control unit that automatically monitors the status of pertinent hydraulic fluid conditions during the operation of the hydraulic drive liquid transfer pump system, and when a tractor trailer delivery system is employed the control unit in addition monitors the status of the tractor brakes. Should any of the monitored conditions indicate malfunction, the control system automatically disengages the power take-off unit associated with the pump system and thereby stops liquid transfer. Such monitoring and automatic disengagement of the power supply ensures that the system can be used safely and reliably. The control system is conceptually illustrated on FIG. 2. The control unit 90 which performs the monitoring and disengagement function is powered from a gas reservoir 70, such as the tractor air reservoir, and a source of electric power 70 and has an output to the power takeoff unit 100. Manual inputs to the control unit including vehicle brake and pumping control signals are shown schematically as block input 80. Hydraulic fluid conditions are shown schematically as block signal input 110 and include in particular, fluid temperature, hydraulic fluid reservoir level, and particulate content of the hydraulic fluid. The control unit illustrated schematically is able to react to inputs and according to the desired action either engage or disengage the power takeoff unit.

Since the liquid delivery unit can be separated into its tractor and trailer portions, it is imperative that such separation not occur and also that the delivery vehicle not be moved in any fashion during a liquid off-loading operation. A means of ensuring that this is the case is to allow system operation only if the tractor is properly parked. The system is set up so that the brakes on the tractor must be set in a park position in order for the system to function. Should the brakes not be set, the unit would automatically disengage the power takeoff and not allow initiation or continuation of any offloading operation.

Another factor associated with safe and reliable operation of the hydraulic drive liquid transfer pump system is related to conditions within the hydraulic fluid circuit. During operation of the system, one of those factors is related to the temperature of the hydraulic fluid. Since the system has high power capacities, the hydraulic fluid circuit involves a considerable input of heat energy. During proper operation of this system, this heat energy is removed from the fluid by the cooler associated with the system. However, should there be any malfunction within the cooling circuit, the fluid temperature would increase rapidly to a level which would cause failure of some of the system components. Such condition would be very unsafe especially if the unit were handling a cryogenic fluid such as liquid oxygen. Accordingly, one of the control functions involves a continuous monitoring of the fluid temperature and should the temperature exceed the set value, the control unit would automatically disengage the power takeoff.

Another hydraulic fluid condition that can lead to unsafe operation is related to the fluid reservoir level or fluid content within the hydraulic circuit. If the fluid inventory is low, the hydraulic pumping units would not be able to transmit the power capacities associated with the system and can overheat or fail in some other mechanical mode. Thus, the control unit associated with this invention monitors the fluid level in the reservoir and shuts down the system automatically should the fluid level fall below an acceptable low level limit.

Another hydraulic fluid condition that is related to safe and reliable operation of the system is related to the particulate content of that hydraulic fluid. Accordingly, the particulate content of the hydraulic fluid is monitored by sensing a fluid pressure drop that is associated with a filter whose purpose is to remove particulate content from the circulating fluid. The pressure drop across this fluid filter is monitored continuously and is used as a measure of particulate content within the circuit. Should the pressure drop across the filter increase above an acceptable low value, it will cause automatic disengagement of the power takeoff unit.

Figure 3:
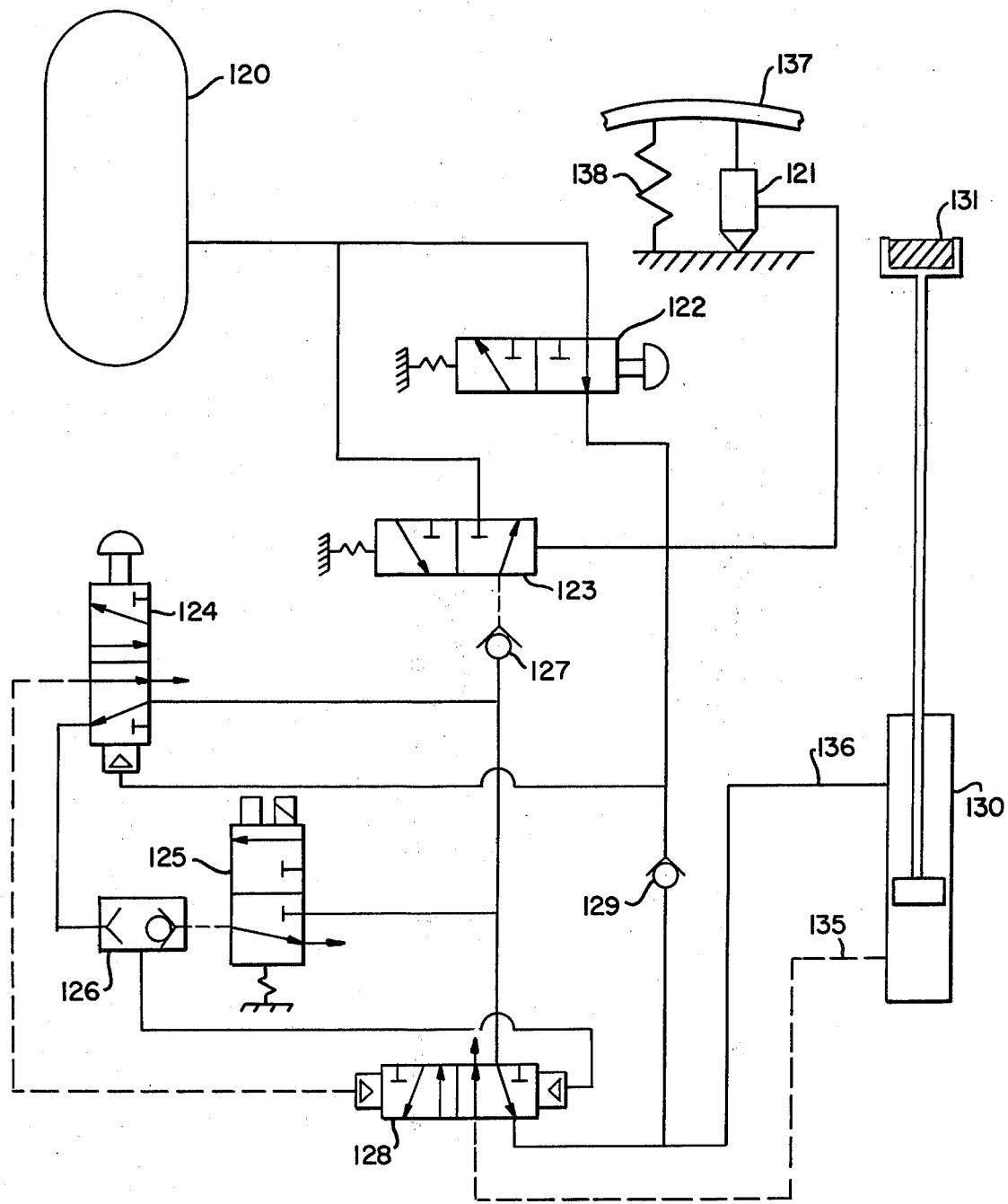
FIG. 3 illustrates the pneumatic control logic circuit when the tractor trailer delivery unit is in the mobile status.

The detailed control unit is illustrated in FIG. 3. In FIG. 3, and in the other drawings, the solid lines denote supply of gas at pressure whereas the dotted lines denote no gas flow or conduits open to the atmosphere. As can be seen, the control unit is basically a combination of pneumatic control valves and other components that combine to route pneumatic signals as desired. The unit is supplied by the gas reservoir and that gas supply is used to supply the motive force for either engaging or disengaging the power takeoff unit through an associated gas cylinder actuator. When a tractor engine is used to power the pump system the gas supply can conveniently be the tractor air reservoir. The associated control valves include manually actuated control valves such as the parking and pumping control units and automatic control valves such as the main power takeoff control valve that actuates the gas cylinder associated with the power takeoff supply, and the inversion valve. Also, the unit includes an electric solenoid operated control valve that is associated with the monitoring of hydraulic fluid conditions and is used to automatically disengage the power takeoff in case of hydraulic fluid malfunction. The control unit is set up to function properly in any of the system operating modes including the mobile, park, pumping, and malfunction mode. For better understanding of the control unit functioning each of these operating system modes will be described separately.

The control unit pneumatic logic circuit associated with a tractor trailer delivery vehicle in the mobile operational mode is illustrated in FIG. 3. The tractor air reservoir 120 is the usual air supply utilized to operate the vehicle brake systems. It serves that function along with supplying the air supply required to operate the control unit and the power takeoff air cylinder. That power takeoff cylinder 130 utilizes the air supply to either engge 135 or disengage 136 the power takeoff unit 131 as required by the control circuit logic. In a non-tractor trailer unit, the power takeoff unit may be replaced by a transmission connection associated with the internal combustion engine. The vehicle parking brakes are the usual failsafe type arrangement that utilizes an actuating spring to apply the brakes and an associated air cylinder 121 to act against the spring and disengage the brakes. This means that air must be supplied to cylinder 121 in order for the vehicle brakes to be in the off position. The control unit logic circuit is composed of five primary pneumatic control valves combined with associated conduits to connect those valves in order to form the required logic circuit. Each of the control valves is a two position control valve whereby each position is attained by a combination of spring, manual, electromotive, or air bias action on the valve itself. Dependent on the position of the valve, appropriate ports and flow channels are arranged to result in the desired pneumatic control logic circuit.

The control valves include two manually operated units including the parking control valve 122 and the pumping control valve 124. Two other valves operated by air pressure bias include the inversion valve 123 associated with the braking function and the power takeoff valve 128 associated with the operation of the power takeoff air cylinder. The final control valve 125 is a solenoid operated unit which utilizes an electrical signal from the monitoring of hydraulic fluid conditions and that valve initiates the automatic disengagement of the power takeoff in response to any signal corresponding to a hydraulic fluid malfunction condition. During the mobile or vehicle travel mode it is, of course, necessary for vehicle brakes to be in the off position and furthermore it is desirable for the power takeoff unit to be in a disengaged position. The pneumatic control logic circuit to accomplish this condition is illustrated in FIG. 3 and combines manually placing parking control valve 122 in the inward position or arrangement whereby air is supplied to the tractor brakes and thereby the vehicle brakes are not applied. Such position also involves the passage of air supplied through check valve 129 to the disengage port 136 of cylinder 130 and ensures that the power takeoff unit is disengaged. The pumping control valve 124 is in the out or pumping unit off position. The placement of these two controls in this position supplies air bias to both the inversion valve 123 and the power takeoff valve 128 so that the inversion valve is in the inward bias position with blocked ports whereas the power takeoff valve supplies air so as to maintain the power takeoff cylinder in the disengage mode. Check valves 126 and 127 are utilized to control gas flow within the pneumatic control circuit.

Figure 4:
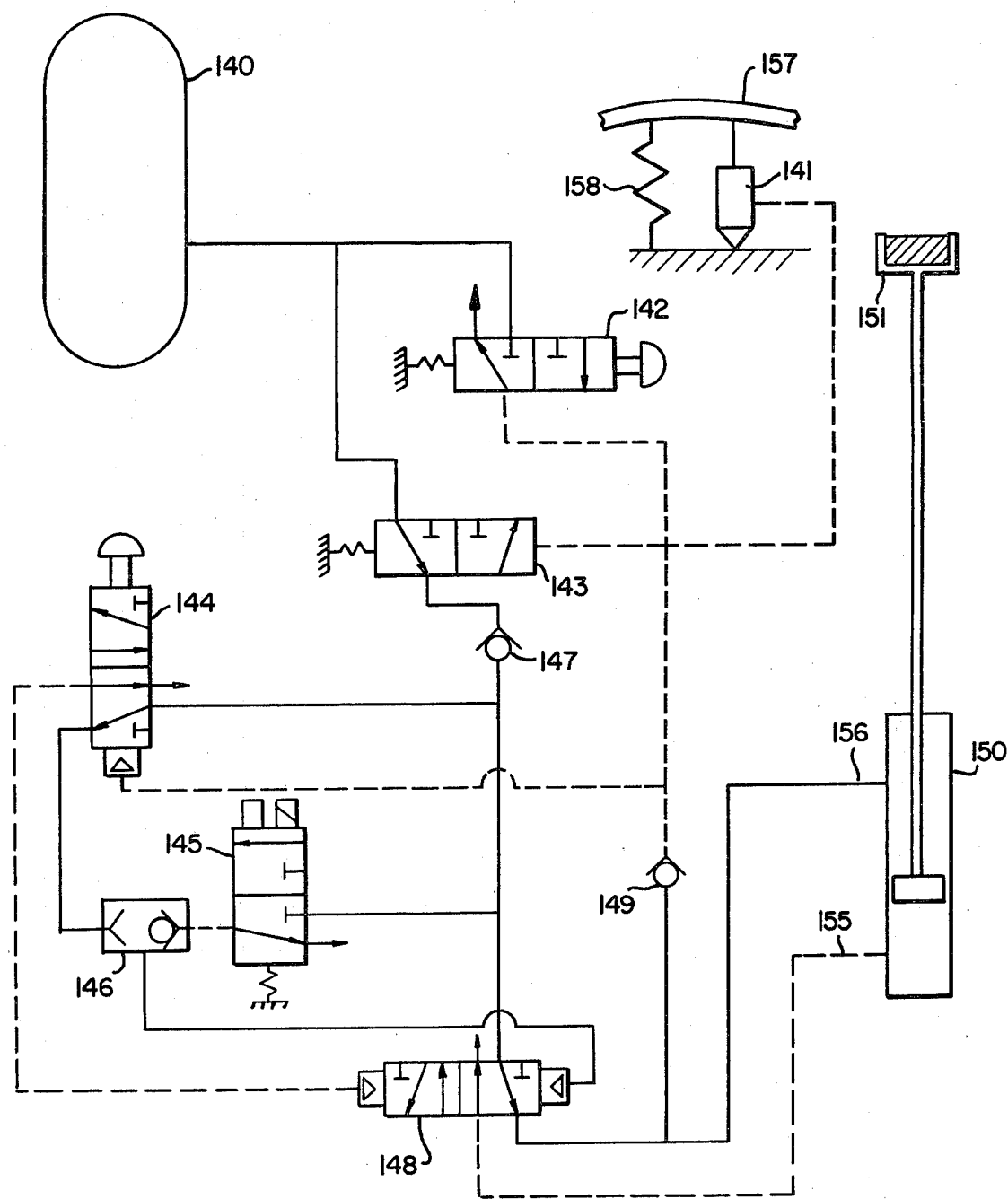
FIG. 4 illustrates the pneumatic control logic circuit when the tractor trailer delivery unit is in the park status.

The pneumatic control logic circuit associated with the vehicle park position is shown on FIG. 4. All components are numbered as in FIG. 3 plus 20. That is, the tractor air reservoir of FIG. 4 is indicated as 140 compared to the 120 designation of FIG. 3 with similar numbering for the other components. The park mode control unit circuit is similar to the mobile mode except for the park control valve 142 and inversion valve 143. In order to park the vehicle, the control valve 142 is manually shifted by an appropriate knob to the out position which serves to release the air pressure on vehicle brake cylinder 141. At the same time, that release of air pressure removes the air supply bias on inversion valve 143 and causes it to shift to the outward position and thereby that inversion valve now supplies air to the remaining circuit. The rest of the circuit is as before with the power takeoff valve 148 serving to pass air to the disengage port of air cylinder 150. Note that check valve 149 serves to block air flow path to the exhaust port associated with parking valve 142 and thereby ensures that air pressure will be maintained on the disengage port of the air cylinder.

Figure 5:
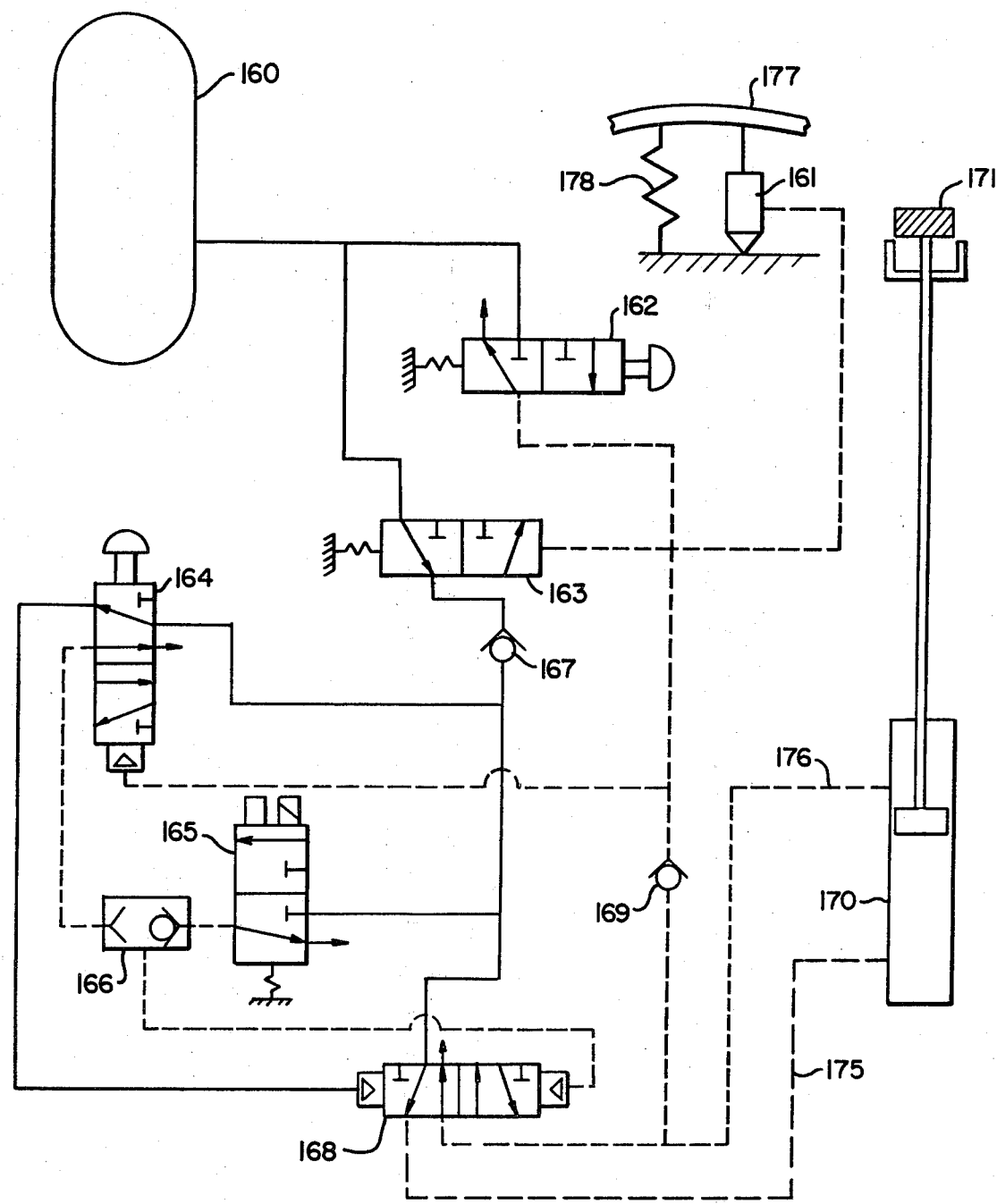
FIG. 5 illustrates the pneumatic control logic circuit when the tractor trailer delivery unit is in the pumping status.

The system pumping mode is illustrated in FIG. 5. This diagram is numbered in accordance with FIG. 3, except that the numerals are increased by 40. The parking control valve 162 and inversion valve 163 are in the position associated with the park mode as described with FIG. 4. The change is associated with the manual operation of pumping control valve 164 by shifting it to an inward position thereby causing the air supply to bias the power takeoff valve 168. The air bias aligns ports so that the air supply associated with the inversion valve 163 is now passed through the power takeoff control valve 168 and to the engage port 175 associated with air cylinder 170. This shifting of the air cylinder then causes power takeoff unit 171 to operate and thereby cause the liquid transfer pump to be power connected to the tractor engine.

Figure 6:
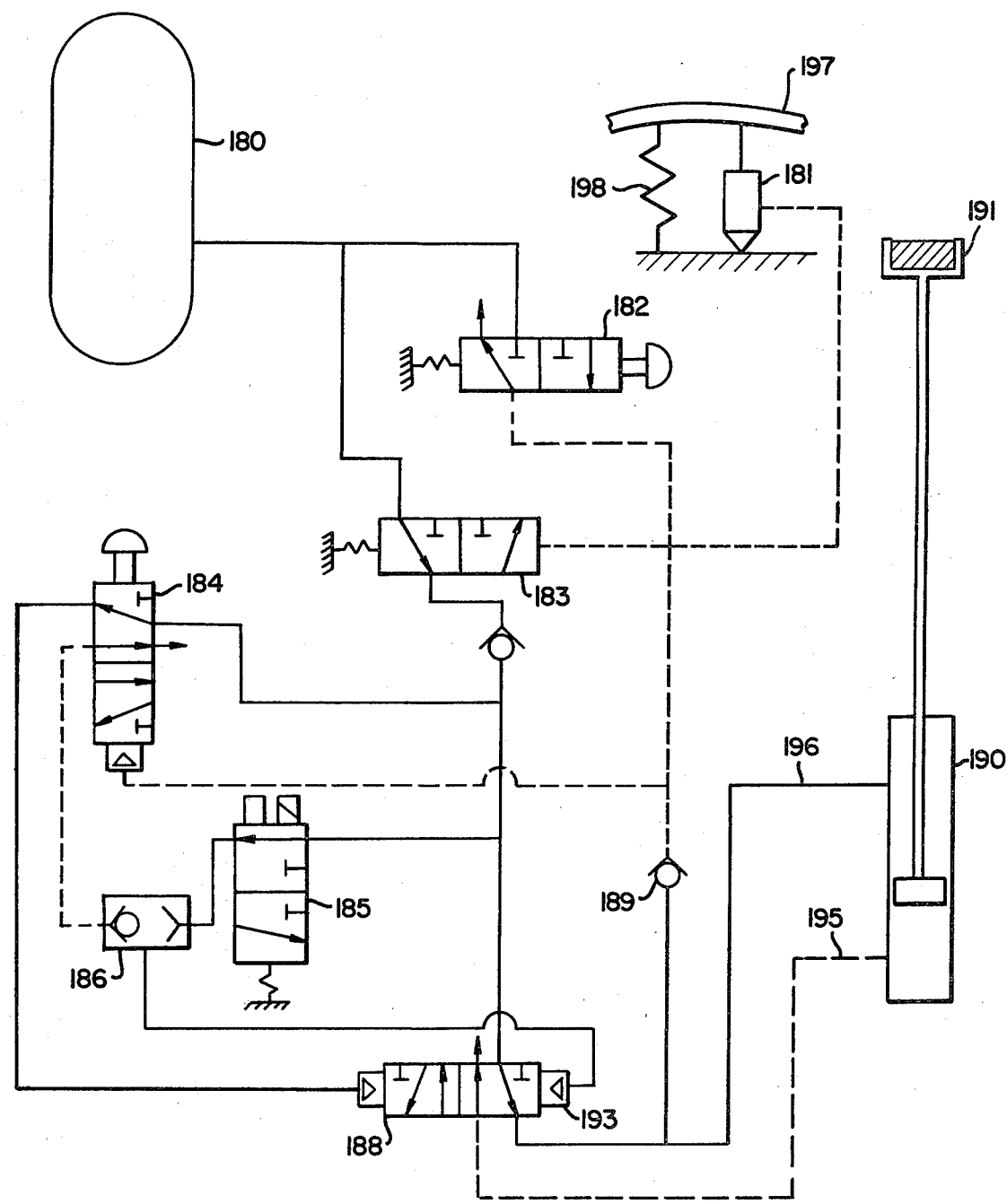
FIG. 6 illustrates the pneumatic control logic circuit when the tractor traier delivery unit has experienced a system malfunction.

The malfunction mode associated with the control unit is illustrated in FIG. 6. This diagram is numbered in accordance with FIG. 3 except that the numerals are increased by 60. Basically the only variation is that the solenoid operated valve 185 utilizes an appropriate electrical signal as obtained from the monitoring of hydraulic fluid condition to shift the valve in and thereby air bias power takeoff valve 188 to the domineering pilot port 193. With this shift in power takeoff valve, the air on the engage port is now exhausted whereas air is supplied to the disengage port 196 and the power takeoff unit 191 is automatically disengaged from the tractor motor. Such action automatically stops system operation and prevents operation during adverse hydraulic fluid conditions.

Figure 7:
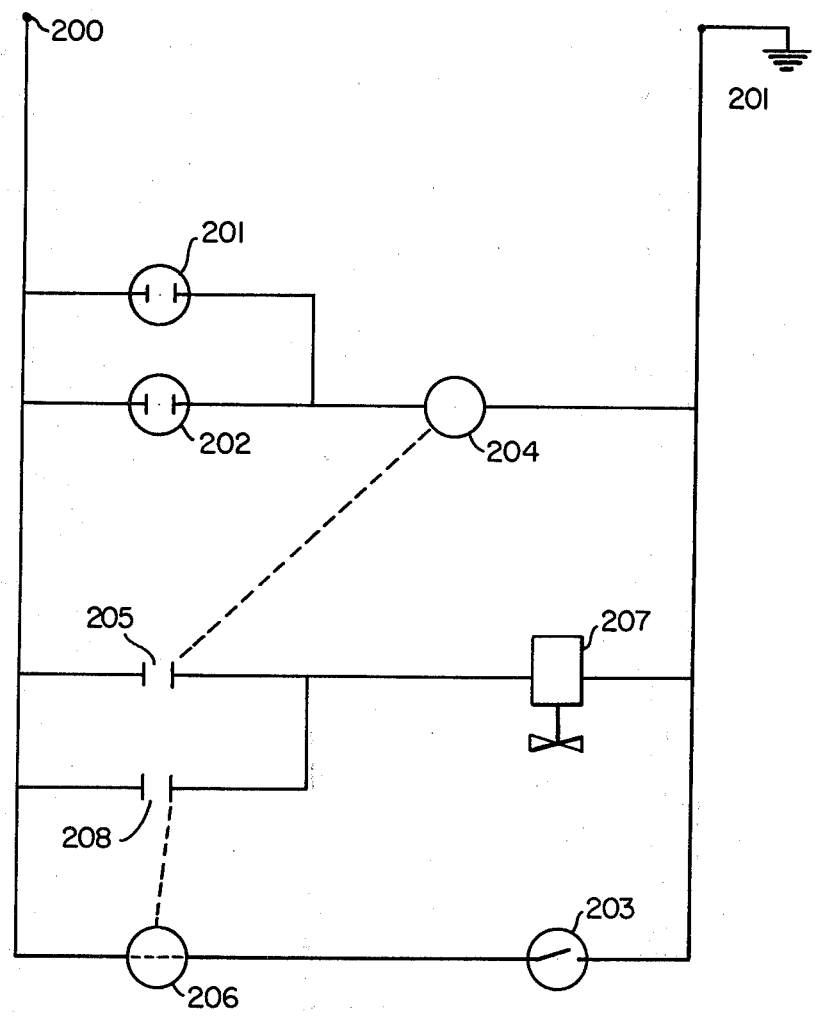
FIG. 7 illustrates the electrical control circuit utilized to monitor hydraulic fluid status and initiate the pneumatic malfunction status upon any adverse fluid condition.

The circuit utilized to monitor hydraulic fluid status is illustrated in FIG. 7. Basically this circit is vehicle battery operated and utilizes an electrical signal 200 with an associated electrical circuit to ground 201 and through various sensors and relays to supply an input to the solenoid operated valve 207 upon detection of an adverse hydraulic fluid condition. Basically the system monitors three separate hydraulic fluid conditions. One condition monitored is the temperature of the hydraulic fluid which is sensed by temperature responsive switch 202. Another hydraulic fluid condition monitored is the particulate content of the fluid which is monitored by sensing the pressure drop across the fluid filter. The pressure drop across the fluid filter is sensed by differential pressure switch 201. Should desirable levels associated with operation of the system be exceeded in that the pressure drop is too high or the temperature is too high, these switches will close thereby energizing relay 204 which will serve to close the contacts 205 and supply power to solenoid coil 207. This solenoid coil 207 is that coil that serves to energize solenoid operated valve 185 as shown in FIG. 6. The energizing of that solenoid causes the inward shift of solenoid operated valve 185 and thereby the automatic disengagement of the power takeoff unit. Another condition that is monitored is the liquid level within the hydraulic fluid reservoir. This condition is sensed by liquid level sensor 203 which will energize relay 206 to close contact 208 and thereby energize solenoid coil 207. It is apparent from the circuit associated with FIG. 7 that exceeding allowble limits on any one of the three hydraulic fluid parameters, that is, temperature, particulate content or reservoir level, will cause energizing of the solenoid and shifting of the solenoid operated valve 185 and thereby automatic disengagement of the power takeoff unit.

Figure 8:
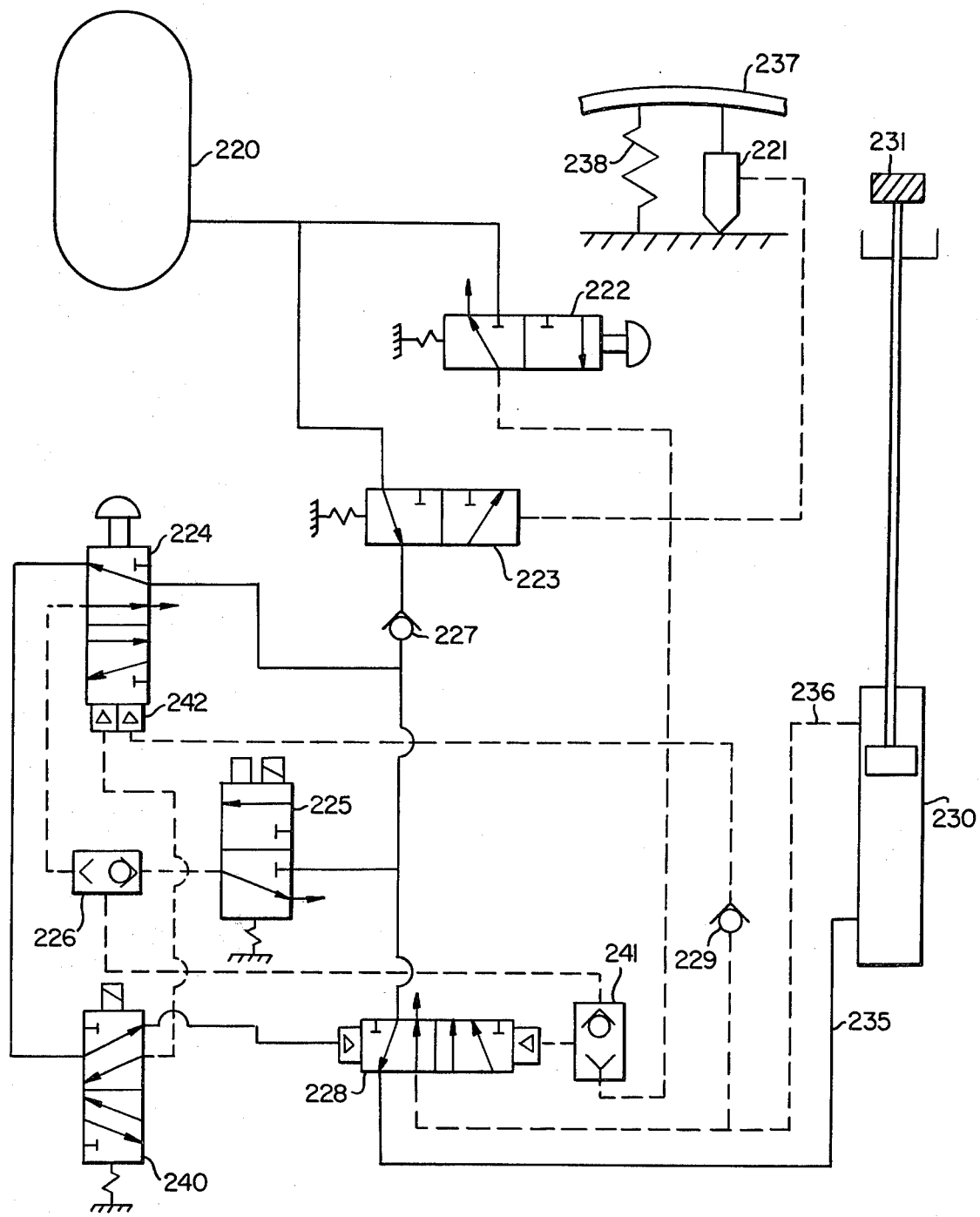
FIG. 8 illustrates the pneumatic control logic circuit when the unit is in the pumping status and includes a second solenoid controlled valve to ensure unit operation only when electrical power is available.

FIG. 8 illustrates a logic control circuit which additionally has a second solenoid operated valve in the circuit to assure that the liquid pump cannot be operated when there is a lack of electric power. FIG. 8 is numbered in accordance with FIG. 3 except that each number is increased by 100. In this arrangement the second solenoid operated valve 240 is connected to the electric power source and to the manually operated pump control valve 224 and the air operated power takeoff valve 228. The manually operated pumping control valve 224 has two independent air pilot ports 242 one of which is connected to the parking brake interlock. FIG. 8 illustrates the arrangement when power is available. When power is available the second solenoid operated valve 240 supplies air bias to power takeoff valve 228 so that air is supplied to the engage port 235 of the power takeoff cylinder 230. Double check valve 241 has the function of supplying air bias to the power takeoff valve 228 and thereby causing disenggement of the power takeoff in case the vehicle parking brake is removed or there is a hydraulic fluid malfunction. This valve 241, of course, can also be included in the logic circuit as shown in the other diagrams.

Figure 9:
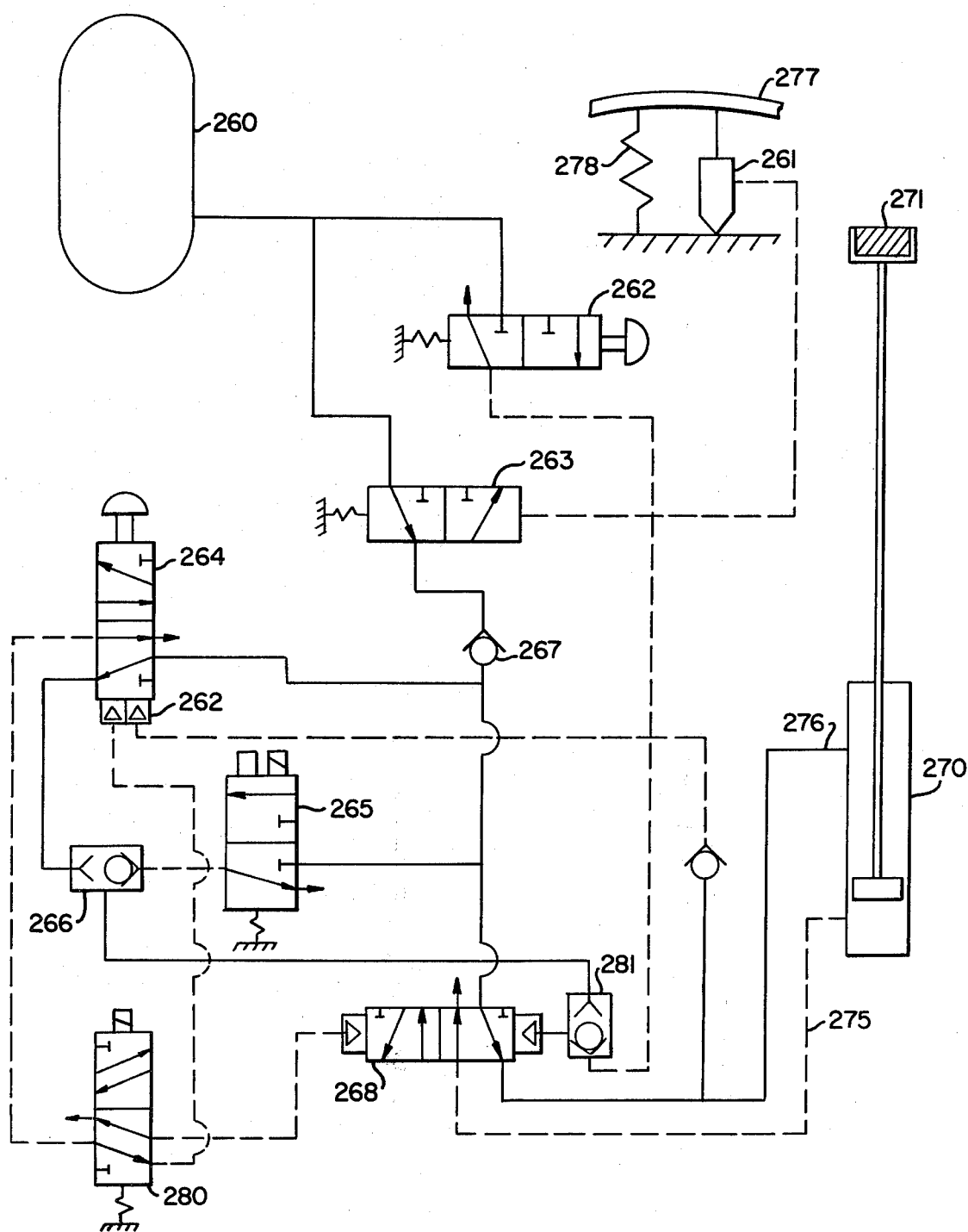
FIG. 9 illustrates the circuit of FIG. 8 with a lack of electrical power.

FIG. 9 illustrates the logic circuit of FIG. 8 with the electric power unavailable. FIG. 9 is numbered in accordance with FIG. 3 with the numbers increased by 140. When power is unavailable second solenoid valve 280 is shifted so that air bias is supplied to manually operated pumping control valve 264, removed from power takeoff valve 268 and thereby air is supplied to the disengage port 276 of the air cylinder 270. Double check valve 281 has the function of supplying air bias to the domineering port of the power take-off valve 268 thereby ensuring that air is supplied to the disengage port 276 of air cylinder 270.

Figure 10:
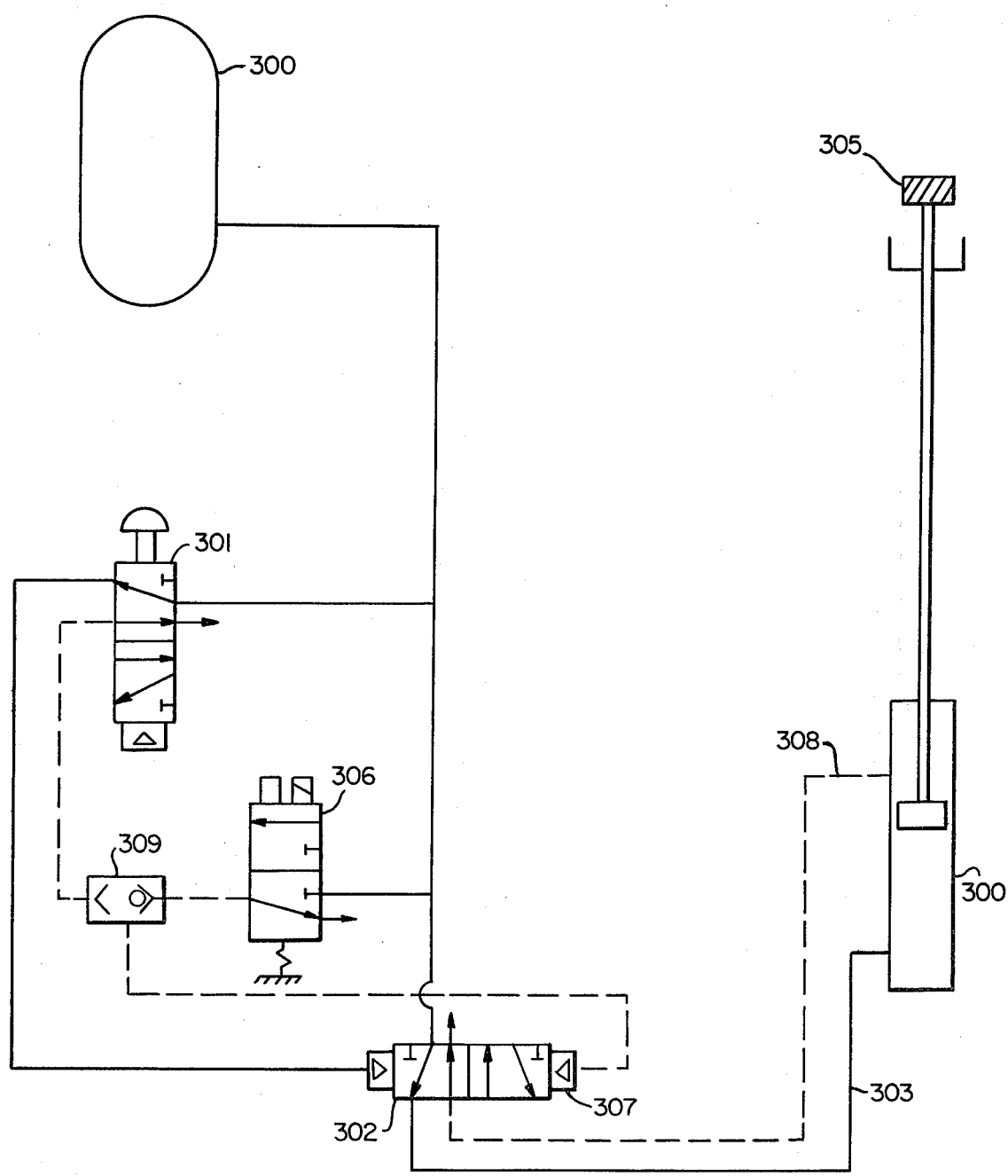
FIG. 10 illustrates the pneumatic control logic circuit adapted for use with a system not requiring a brake interlock.

FIG. 10 illustrates the logic circuit wherein parking brake status need not be monitored. This circuit for example is useful when the liquid pump transfer system is stationary. FIG. 10 shows the transfer system in the pumping mode. In FIG. 10, gas is supplied from gas reservoir 300 to manually operated pumping control valve 301 which has been placed inward in the pump position. Such control valve position supplies gas to the gas operated power takeoff valve 302 such that gas is supplied to the engage port 303 of the gas cylinder 304 of the power takeoff unit 305. Gas is also supplied to the solenoid operated valve 306 and the gas operated power takeoff valve 302 such that the gas pressure is maintained on the engage port 303.

Should there be a hydraulic fluid malfunction, solenoid operated valve 306 will, as before, shift position such that air bias is applied through check valve 309 to the domineering port 307 of the gas operated power takeoff valve 302. This causes gas supply to the disengage means 308 of gas cylinder 304 and also causes gas to exhaust from engage port 303.

A summary of control unit status associated with the various system operating modes described is shown in Table I.

TABLE I

| | CONTROL UNIT STATUS | | | |
|---|---|---|---|---|
| System Mode | Mobile | Park | Pumping | Malfunction |
| Vehicle Brakes | Off | On | On | On |
| Power Takeoff Unit | Off | Off | On | Off |
| Control Valve Status | | | | |
| Parking | In | Out | Out | Out |
| Inversion | In | Out | Out | Out |
| Pumping | Out | Out | In | In |
| Malfunction | Out | Out | Out | In |
| Power Takeoff | Out | Out | In | Out |

It can be appreciated from the previous description of the control unit that the system is a fail safe unit that allows engaging the power takeoff unit and thereby operation of the liquid transfer pump system only if the vehicle is properly parked and all hydraulic fluid conditions are acceptable. Should an operator neglect to apply vehicle brakes or inadvertently disengage the brakes the control system would automatically disengage the power takeoff and cease pump operation. Likewise, should any of the three hydraulic fluid conditions (temperature, particulate content, and reservoir level) exceed allowable limits, the control unit would automatically sense that condition, energize the solenoid valve and automatically disengage the power takeoff unit and cease pump operation. Such automatic monitoring of conditions associated with the safe and reliable operation of hydraulic system ensures that the system can be operated properly.

The improved hydraulic drive liquid pump system of this invention may be employed to transfer any liquid from a delivery vehicle. However, the improved pump system of this invention is especially advantageous for cryogenic liquids such as liquid nitrogen, argon, oxygen, hydrogen or liquefied natural gas.

Any suitable hydraulic fluid may be employed as the hydraulic fluid in the improved hydraulic drive liquid pump system of this invention, However, when the liquid to be transferred presents a combustion hazard, such as, for example, liquid oxygen, a non-combustible hydraulic fluid, such as a commercially available phosphate-ester hydraulic fluid, is preferred.

By means of the improved hydraulic liquid pump system of this invention one can now utilize the tractor engine to increase the power available to hydraulic liquid pumps without the heretofore unavoidable increased safety risks associated with running at higher power capacities. One can now operate liquid transfer pumps at 65 horsepower and more with the resulting savings in off loading time and without significantly increased risk to operators and equipment.

Although the control unit of this invention is especially applicable to high power transfer systems, such as those operating at from 65 to 105 horsepower, the control unit enhances the safety and reliability of all hydraulic drive liquid transfer pump systems.

What is claimed is:

1. In a hydraulic drive liquid transfer pump system comprising:
(1) a tractor having an internal combustion engine, an air reservoir, air brakes with cylinder and a source of electric power,
(2) a power takeoff unit connected to said internal combustion engine having a power takeoff cylinder having an engage port and a disengage port,
(3) hydraulic pump means mounted on the tractor and connected to said power takeoff means,
(4) a fluid reservoir communicating with said hydraulic pump means,
(5 ) a trailer,
(6) hydraulic motor means mounted on said trailer,
(7) hydraulic fluid line means intercoupled between said hydraulic pump and said hydraulic motor means, said hydraulic fluid line means carrying a hydraulic fluid,
(8) liquid pump means driven by the hydraulic motor means,
(9) filter means located within said hydraulic fluid line means, the improvement consisting of a control system connected to said tractor air reservoir and said power takeoff unit comprising:
(a) means to sense the temperature of said hydraulic fluid, said means connected to said source of electric power,
(b) means to sense the pressure differential of said hydraulic fluid across said filter means, said means connected to said source of electric power,
(c) means to sense the hydraulic fluid level in said fluid reservoir, said means connected to said source of electric power, (d) a manually operated parking control valve in communication by means of pneumatic conduit with the tractor air reservoir, the air brake cylinder, the disengage port of the power takeoff unit, an air operated inversion valve, a manually operated pumping control valve, and an air operated power takeoff valve, (e) said air operated inversion valve in communication by means of pneumatic conduit also with the tractor air reservoir, the manually operated pumping control valve, the air operated power takeoff valve, and a solenoid operated valve, (f) said manually operated pumping control valve in communication by means of pneumatic conduit also with the air operated power takeoff valve, (g) said air operated power takeoff valve in communication by means of pneumatic conduit also with the engage port and the disengge port of the power takeoff unit, (h) said solenoid operated valve in communication by pneumatic conduit means also with said power takeoff valve and by electric connection means to said temperature sensor means, said pressure differential sensor means and said liquid level sensor means.

2. An improved pump system as claimed in claim 1 wherein said hydraulic fluid is a phosphate-ester composition.

3. An improved pump system as claimed in claim 1 wherein said liquid pump means is a cryogenic pump.

4. An improve pump system as claimed in claim 1 wherein cooler means are connected on the low pressure conduit between the hydraulic motor and the hydraulic pump.

5. An improved pump system as claimed in claim 1 wherein said hydraulic pump means operates from about 65 to about 105 horsepower.

6. An improved pump system as claimed in claim 1 wherein there is additionally present a second solenoid operated valve in communication by electrical connection to said source of electric power and by pneumatic conduit with said manually operated pumping control valve and said air operated power takeoff valve.

7. In a hydraulic drive liquid transfer pump system comprising:
(1) an internal combustion engine,
(2) a gas reservoir,
(3) a source of electric power,
(4) transmission means connected to said internal combustion engine having a power takeoff cylinder having an engage port and disengage means,
(5) hydraulic pump means connected to said transmission means,
(6) a fluid reservoir communicating with said hydraulic pump means,
(7) hydraulic motor means,
(8) hydraulic fluid line means intercoupled between said hydraulic pump means and said hydraulic motor means, said hydraulic fluid line means carrying a hydraulic fluid,
(9) liquid pump means driven by the hydraulic motor means,
(10) filter means located within said hydraulic fluid line means, the improvement consisting of a control system connected to said gas reservoir and said power takeoff cylinder comprising:

(a) means to sense the temperature of said hydraulic fluid, said means connected to said source of electric power, (b) means to sense the pressure differential of said hydraulic fluid across said filter means, said means connected to said source of electric power, (c) means to sense the hydraulic fluid level in said fluid reservoir, said means connected to said source of electric power, (d) a manually operated pumping control valve in communication by means of pneumatic conduit with a gas operated power takeoff valve a solenoid operated valve and said gas reservoir, (e) said gas operated power takeoff valve in communication by means of pneumatic conduit also with the engage port and the disengage means of the power takeoff cylinder, and said gas reservoir, (f) said solenoid operated valve in communication by pneumatic conduit means also with said power takeoff valve and said gas reservoir, and by electric connection mens to said temperature sensor means, said pressure differential sensor means and said liquid level sensor means.

* * * * *

UNITED STATES PATENT AND TRADEMARK OFFICE
CERTIFICATE OF CORRECTION

PATENT NO. : 4,416,590
DATED : November 22, 1983
INVENTOR(S) : Eugene C. Colucci It is certified that error appears in the above-identified patent and that said Letters Patent are hereby corrected as shown below:

In column 1, line 39, delete "system" and insert therefore -- systems --.

In column 1, line 54, delete "reactor" and insert therefore -- tractor --.

In column 2, line 59, delete "skiled" and insert therefore -- skilled --.

In column 3, line 22, after "power," delete "$p^1$".

In column 3, line 33, delete "ink" and insert therefore -- in --.

In column 3, line 37, delete "operator" and insert therefore -- operated --.

In column 4, line 39, delete "traier" and insert therefore -- trailer --.

UNITED STATES PATENT AND TRADEMARK OFFICE
CERTIFICATE OF CORRECTION

PATENT NO. : 4,416,590

DATED : November 22, 1983

INVENTOR(S) : Eugene C. Colucci

It is certified that error appears in the above-identified patent and that said Letters Patent is hereby corrected as shown below:

In column 6, lines 32 and 33, after "fluids" delete the phrase "system is a closed circuit operation with the fluids".

In column 8, line 49, delete "engge" and insert therefore -- engage --.

In column 10, line 20, delete "circit" and insert therefore -- circuit --.

In column 11, line 5, delete "enggement" and insert therefore -- engagement --.

In column 12, line 6, between "of" and "hydraulic" insert -- the --.

In claim 4, line 1, delete "improve" and insert therefore -- improved --.

In claim 7, line 44, delete "mens" and insert therefore -- means --.

Signed and Sealed this

Seventh Day of February 1984

[SEAL]

Attest:

GERALD J. MOSSINGHOFF

Attesting Officer

Commissioner of Patents and Trademarks